2,951,077

BASIC ALKYLTHIOALKYL ESTERS OF PHENOTHIAZINE-10-CARBOXYLIC ACID AND THEIR SALTS

Gordon S. Myers, St. Laurent, Quebec, and Martin Arnold Davis, Montreal, Quebec, Canada, assignors to American Home Products Corporation, New York, N.Y., a corporation of Delaware No Drawing. Filed Aug. 14, 1958, Ser. No. 754,940

10 Claims. (Cl. 260—243)

This invention relates to novel basic alkylthioalkyl esters of phenothiazine-10-carboxylic acid and their acid addition and quaternary ammonium salts. It also relates to the process by which these novel compounds may be prepared.

The new chemical compounds, in the form of basic esters, more particularly basic ethylthioethyl esters of phenothiazine-10-carboxylic acid, may be represented by the following general formula:

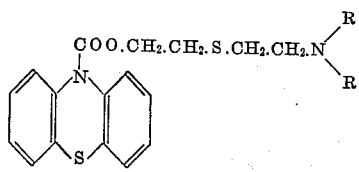

where R represents lower alkyl. These compounds will form acid addition salts with a variety of inorganic and organic acids, as well as quaternary ammonium salts with lower alkyl halides.

Both acid addition and quaterary ammonium salts, as well as the free bases, are pharmacologically active, and both the basic esters and their salts are intended to be included within the scope of our invention.

In preparing the novel basic esters a phenothiazine-10-carboxylic acid halide may be reacted with a basically substituted ethylthioethanol. This is readily accomplished by bringing the reactants together in a diluent such as pyridine and heating the reaction mixture to an elevated temperature, as, for example, one in the vicinity of 90–100° C. After cooling, the free basic ester may be liberated by adding a base, such as sodium hydroxide, to the reaction mixture which has been diluted by the previous addition of ice water. The basic ester is then readily recovered by extracting the reaction mixture with an organic extractant, such as ether, followed by washing with water and evaporation of the ether to secure the new compound.

Acid addition salts of the basic esters are readily prepared by adding a slight excess of the acid whose salt is desired to a solution of the free basic ester in a suitable solvent as, for example, in ether. Quaternary ammonium salts are similarly prepared by adding a solution of an alkyl halide, such as methyl bromide, to an ethereal solution of the basic ester.

The new compounds possess antibacterial activity against both gram-positive and gram-negative bacteria. As bacteriostatic agents they are from two to four times more active against a representative group of gram-positive and gram-negative bacteria than the corresponding oxygen-containing compounds, which are disclosed, for example, in Patent No. 2,778,824, to Carl von Seemann.

Utilizing 2'-(dimethylaminoethylthioethyl) phenothiazine-10-carboxylate maleate, one of the new compounds, as a typical example, we give below the minimum inhibitory concentrations of this compound when utilized as a bacteriostatic agent against a representative list of bacteria:

| | |
|---|---|
| Staphylococcus pyogenes (penicillin-sensitive) | 3200 |
| Staphylococcus pyogenes (pinicillin-resistant) | 3200 |
| Sarcina lutea | Greater than 6400 |
| Streptococcus faecalis | Greater than 6400 |
| Aerobacter aerogenes | 1600 |
| Pseudomonas aeruginosa | 3200 |
| Proteus vulgaris | 1600 |

These minimum inhibitory concentrations represent one part of the substance tested in the indicated number of parts of nutrient solution, such concentration being necessary for complete inhibition of growth.

As a comparison, the minimum inhibitory concentrations of a typical compound of the von Seemann patent, 2' - (dimethylaminoethoxyethyl)phenothiazine - 10 - carboxylate hydrochloride, against the same bacteria were found to be as follows:

| | |
|---|---|
| Staphylococcus pyogenes (penicillin-sensitive) | 1600 |
| Staphylococcus pyogenes (penicillin-resistant) | 1600 |
| Sarcina lutea | 3200 |
| Streptococcus faecalis | 3200 |
| Aerobacter aerogenes | 800 |
| Pseudomonas aeruginosa | 800 |
| Proteus vulgaris | 800 |

These results show that the S-containing compounds of this invention are from two to four times more active as bacteriostatic agents than the oxygen-containing analogs of the issued patent.

The following examples are illustrative of our invention:

*Example 1*

To a suspension of 26.1 grams (0.1 mol) of phenothiazine-10-carboxylic acid chloride in 50 milliliters of dry pyridine was added dropwise, with stirring, a solution of 17.7 grams (0.1 mol) of β-diethylaminoethylthioethanol in 50 milliliters of pyridine. The addition required about 20 minutes, and the reaction mixture was maintained at approximately room temperature by means of external cooling.

The temperature was then raised to 90° C. by heating over a period of 30 minutes. It was held at this temperature by continued heating for a further period of 45 minutes. The solution was then cooled, and poured onto 400 milliliters of ice water. The basic ester, 2'-(diethylaminoethylthioethyl)phenothiazine - 10 - carboxylate, was then liberated from the solution by the addition thereto of sodium hydroxide solution. The compound was taken up in ether and washed free from pyridine by repeated extractions with water. Upon removal of the solvent by evaporation, the basic ester remained behind in the form of a dark, oil material.

A quantity of the basic ester, 2'-(diethylaminoethylthioethyl)phenothiazine-10-carboxylate, was then dissolved in ether and treated with an equal weight of citric acid dissolved in acetone. This resulted in the citrate salt of 2'-(diethylaminoethylthioethyl)phenothiazine-10-carboxylate which, after recrystallization from acetone, melted at 99–101° C. (dec.).

Analysis confirmed the empiric formula $C_{27}H_{34}N_2O_9S_2$ for the citrate salt. Required: C, 54.53; H, 5.76; S, 10.78. Found: C, 55.17; H, 5.93; S, 10.98.

A further quantity of the basic ester dissolved in ether was treated with methyl bromide. This resulted in the methobromide salt of 2'-(diethylaminoethylthioethyl)phenothiazine-10-carboxylate which, after recrystallization from mixed ethanol-ether, melted at 155–160° C. (dec.)

Analysis confirmed the empiric formula $$C_{22}H_{29}N_2O_2S_2Br$$

for the methobromide salt. Required: Br, 16.06; S, 12.89. Found: Br, 15.89; S, 12.50.

*Example 2*

A solution of 26.1 grams (0.1 mol) of phenothiazine-10-carboxylic acid chloride in pyridine was treated with a solution of 16.4 grams (0.1 mol) of β-dimethylaminoethylthioethanol in pyridine, following the procedure described in Example 1. After heating, cooling, addition of sodium hydroxide solution, and extraction of the basic ester with ether, followed by washing and evaporation of the solvent, as in Example 1, there were secured 44 grams of a dark, heavy oil. This was chromatographed on alumina from a 45 percent solution of benzene in hexane and the crude ester, thus secured, was further purified by the addition of dilute hydrochloric acid, extraction with benzene, and subsequent liberation of the basic ester by the addition of ammonia. Extraction of the aqueous layer with ether and removal of the solvent gave 9.5 grams of 2'-(dimethylaminoethylthioethyl)phenothiazine-10-carboxylate as an oily product.

To an ethereal solution of the basic ester there was then added an excess of maleic acid, thereby forming the maleate salt of 2'-(dimethylaminoethylthioethyl)phenothiazine-10-carboxylate. This product formed white crystals which, when recrystallized from mixed ethanol-ether, melted at 106–109° C.

Analysis confirmed the empiric formula $C_{23}H_{26}N_2O_6S_2$ for the maleate salt. Required: C, 56.32; H, 5.34; N, 5.71. Found: C, 56.43; H, 5.55; N, 5.66.

*Example 3*

99.5 grams (0.5 mol) of di-isopropylaminoethyl chloride hydrochloride were dissolved in 100 milliliters of methanol. To the resulting solution there was slowly added a solution of 27 grams (0.5 mol) of sodium methoxide in 200 milliliters of methanol, and the mixture was stirred during the addition. The mixed solutions were then filtered, and the filtrate was added dropwise to a solution containing 39.0 grams (0.5 mol) of mercaptoethanol and 27.0 grams (0.5 mol) of sodium methoxide in 500 milliliters of methanol.

The reaction mixture was then heated under reflux for two and one-half hours, whereupon it was cooled, filtered, and distilled in vacuo, i.e. at a pressure less than atmospheric. The substituted thioalcohol, β-di-isopropylaminoethylthioethanol, was thereby secured. It boiled at 100° C. at 0.3 millimeter of mercury pressure; ($n_D^{26}$ 1.4879).

Analysis confirmed the empiric formula $C_{10}H_{23}NOS$. Required: N, 6.82; S, 15.62. Found: N, 6.29; S, 15.63.

*Example 4*

26.1 grams (0.1 mol) of phenothiazine-10-carboxylic acid chloride was suspended in 50 milliliters of dry pyridine, and there was added dropwise, with stirring, a solution of 20.5 grams (0.1 mol) of β-di-isopropylaminoethylthioethanol in dry pyridine. The procedure then followed that described in Example 1. After cooling, addition of the sodium hydroxide solution, extraction with ether and removal of the solvent by evaporation, there was obtained 39 grams of 2'-(di-isopropylaminoethylthioethyl)phenothiazine-10-carboxylate in the form of a dark colored oil. This crude basic ester was then purified by chromatography on alumina from benzene, followed by extraction with benzene, addition of ammonia, and extraction again of the purified basic ester by the addition of ether, following generally the procedure described in Example 2. Upon removal of the solvent the purified basic ester, 2'-(di-isopropylaminoethylthioethyl)phenothiazine - 10 - carboxylate, was secured as an oily product.

By treatment of a small quantity of the basic ester with an excess amount of citric acid dissolved in acetone, there was secured the citrate salt of 2'-(di-isopropylaminoethylthioethyl)phenothiazine-10-carboxylate. This was purified by dissolving it in isopropanol, followed by precipitation therefrom by the addition of ether, to yield the purified salt as a white, amorphous solid melting at 49–54° C.

Analysis confirmed the empiric formula $C_{29}H_{38}N_2O_9S_2$ for the citrate salt. Required: N, 4.50; S, 10.29. Found: N, 4.62; S, 10.21.

We claim:

1. A compound selected from the group which consists of basic esters of the formula

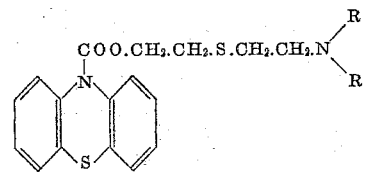

where R represents lower alkyl; and the citrate, maleate and methobromide salts of said basic esters.

2. A basic ester of the formula

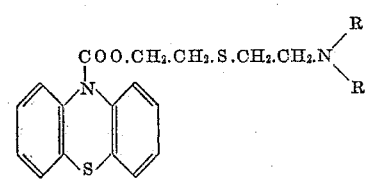

where R represents lower alkyl.

3. 2' - (dimethylaminoethylthioethyl)phenothiazine - 10-carboxylate.

4. 2' - (diethylaminoethylthioethyl)phenothiazine - 10-carboxylate.

5. 2' - (di - isopropylaminoethylthioethyl)phenothiazine-10-carboxylate.

6. The maleic acid salt of 2'-(dimethylaminoethylthioethyl)phenothiazine-10-carboxylate.

7. The citric acid salt of 2'-(diethylaminoethylthioethyl)phenothiazine-10-carboxylate.

8. The methobromide salt of 2'-(diethylaminoethylthioethyl)phenothiazine-10-carboxylate.

9. The citric acid salt of 2'-(di-isopropylaminoethylthioethyl)phenothiazine-10-carboxylate.

10. The method of preparting a basic ester of the formula

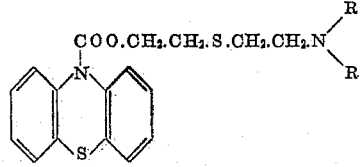

where R is lower alkyl, which comprises bringing into contact, at an elevated temperature not in excess of about 100° C., and in pyridine solution, phenothiazine-10-carboxylic acid chloride and a substituted thioethanol of the formula
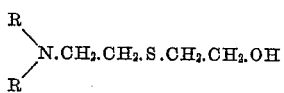
where R has the significance as above defined.
References Cited in the file of this patent
UNITED STATES PATENTS
2,778,824    von Seeman _____ Jan. 22, 1957
FOREIGN PATENTS
515,180    Canada _____ Aug. 2, 1955
305,577    Switzerland _____ May 2, 1955
OTHER REFERENCES
Dahlbom: Acta Chem. Scand., vol. 7 (1953), pp. 879–884.
Lowy et al.: An Introduction to Organic Chem., 6th ed. (1945), p. 213, John Wiley and Sons, New York.